H. T. MOLER.
SANITARY COMB.
APPLICATION FILED FEB. 3, 1908.
909,635.
Patented Jan. 12, 1909.
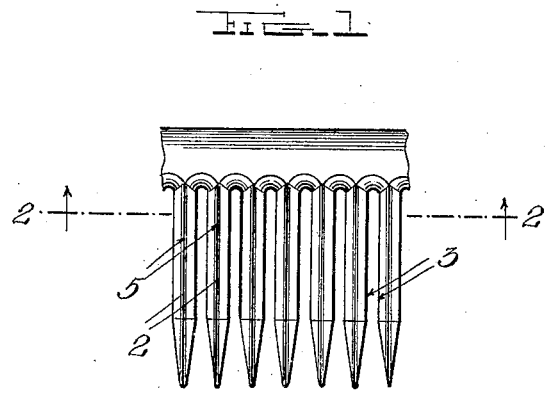
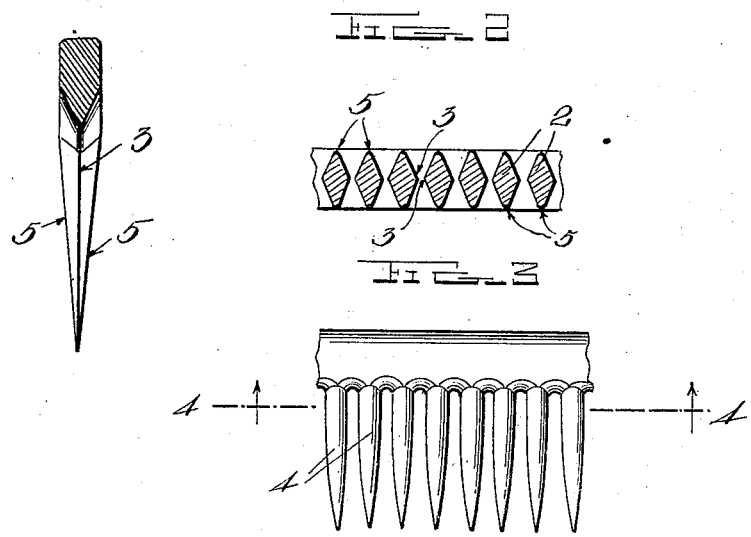
Witnesses
Inventor
Harvey T. Moler

UNITED STATES PATENT OFFICE.

HARVEY T. MOLER, OF PITCAIRN, PENNSYLVANIA.

SANITARY COMB.

No. 909,635.  Specification of Letters Patent.  Patented Jan. 12, 1909.

Application filed February 3, 1908. Serial No. 414,120.

*To all whom it may concern:*

Be it known that I, HARVEY T. MOLER, a citizen of the United States, residing at Pitcairn, in the county of Allegheny and State of Pennsylvania, have invented certain new and useful Improvements in Sanitary Combs; and I do declare the following to be a full, clear, and exact description of the invention, such as will enable others skilled in the art to which it appertains to make and use the same.

This invention relates to an improved self-cleaning sanitary toilet comb.

The object of the invention is to provide a toilet comb with the teeth so constructed and arranged as to prevent the collection of dust and dirt thereon and therebetween and to facilitate the removal of any which may adhere thereto, the passage of the hair between the peculiarly shaped teeth tending to assist in keeping them clean.

In the accompanying drawings,—Figure 1 is a side elevation of a portion of a comb embodying one form of this invention, Fig. 2 is a horizontal section taken on line 2—2 of Fig. 1, Fig. 3 is a side elevation of a slightly modified form, Fig. 4 is a horizontal section taken on line 4—4 of Fig. 3. Fig. 5 is a transverse section taken through the comb between the teeth.

In the embodiment illustrated in Figs. 1 and 2, a comb 1 is shown having teeth as 2, preferably approximately diamond-shaped in cross section, preferably arranged with the edges or corners 3 thereof adjacent and in alinement with a line drawn longitudinally through the center of the comb. These edges 3 and the edges 5 are preferably rounded sufficiently to prevent cutting or breaking of the hair, and the teeth taper toward their free ends, as in the ordinary comb.

The lower edge of the comb back between the teeth is beveled on opposite sides to form a blunt wedge-like edge, as shown in Fig. 5, which provides for the ready cleaning of the comb by drawing the fingers transversely thereof and longitudinally of and between the adjacent teeth whereby the dirt is removed without necessitating the use of a pin or other instrument.

In Figs. 3 and 4 the teeth 4 are shown oblong, with their longest diameters arranged longitudinally of the comb. The round faces thereof serve to prevent collection of dirt thereon and facilitate the removal thereof if any should adhere thereto.

I claim as my invention:

1. A comb having the teeth thereof provided with projecting faces on their inner sides adjacent to each other and with the lower edge of the comb back between the teeth beveled on opposite sides to form arc-shaped recesses between the teeth on opposite sides of the comb, the outer edges of said recesses forming a continuation of the other outer edges of the teeth.

2. A comb having the teeth thereof approximately diamond-shaped in cross section, the adjacent teeth having their corners or edges arranged in proximity.

3. A comb having the teeth thereof approximately diamond-shaped in cross section, the adjacent teeth having their corners or edges arranged in proximity and in alinement with a line drawn longitudinally through the center of the comb, and with the lower edge of the comb back between the teeth beveled on opposite sides the adjacent inside corners of the teeth forming a continuation of the sharpened middle edges of the beveled back.

In testimony whereof I have hereunto set my hand in presence of two subscribing witnesses.

HARVEY T. MOLER.

Witnesses:
J. E. BATEMAN,
C. S. REED.